US007828863B2

(12) United States Patent
Lindström et al.

(10) Patent No.: US 7,828,863 B2
(45) Date of Patent: Nov. 9, 2010

(54) METHOD AND ARRANGEMENT FOR REFORMING FUEL

(75) Inventors: Bard Lindström, Stockholm (SE); Per Ekdunge, Västra Frölunda (SE); Per Rutquist, Göteborg (SE)

(73) Assignee: AB Volvo, Gothenburg (SE)

(*) Notice: Subject to any disclaimer, the term of this patent is extended or adjusted under 35 U.S.C. 154(b) by 854 days.

(21) Appl. No.: 11/572,325

(22) PCT Filed: Jul. 19, 2005

(86) PCT No.: PCT/EP2005/007861
§ 371 (c)(1),
(2), (4) Date: Jan. 19, 2007

(87) PCT Pub. No.: WO2006/008138
PCT Pub. Date: Jan. 26, 2006

(65) Prior Publication Data
US 2007/0287038 A1 Dec. 13, 2007

(30) Foreign Application Priority Data
Jul. 19, 2004 (SE) .............................. 2004/001142

(51) Int. Cl.
C01B 3/36 (2006.01)
C01B 6/24 (2006.01)
C01B 3/02 (2006.01)
C01B 3/24 (2006.01)
C10J 3/46 (2006.01)
C10J 3/54 (2006.01)

(52) U.S. Cl. .................. 48/197 R; 48/61; 423/644; 423/648.1; 423/650; 423/651

(58) Field of Classification Search ................ 48/61, 48/197 R; 423/644, 648.1, 650, 651
See application file for complete search history.

(56) References Cited

U.S. PATENT DOCUMENTS

| 5,741,474 | A |   | 4/1998 | Isomura et al. |
|-----------|---|---|--------|----------------|
| 6,007,931 | A | * | 12/1999 | Fuller et al. ................ 429/13 |
| 6,383,468 | B1 |   | 5/2002 | Schussler et al. |
| 6,815,106 | B1 | * | 11/2004 | Salvador et al. .............. 429/22 |
| 2002/0172630 | A1 | * | 11/2002 | Ahmed et al. .............. 422/190 |
| 2005/0181247 | A1 | * | 8/2005 | Foger et al. .................. 429/17 |

FOREIGN PATENT DOCUMENTS

| EP | 1160193 A | 12/2001 |
| WO | 03042097 A | 5/2003 |
| WO | 03/063284 A | 7/2003 |
| WO | 2004/009490 A | 1/2004 |

OTHER PUBLICATIONS

International Search Report from corresponding International Application PCT/EP2005/007861.
International Preliminary Report on Patentability from corresponding International Application PCT/EP2005/007861.

* cited by examiner

Primary Examiner—Alexa D Neckel
Assistant Examiner—Matthew J Merkling
(74) Attorney, Agent, or Firm—WRB-IP LLP

(57) ABSTRACT

A method and an arrangement for reforming a hydrocarbon fuel such as dimethyl ether (DME), methanol, ethanol, propanol, or any variants or other oxidized fuels is disclosed for generating hydrogen especially for supplying a fuel cell. Furthermore, a fuel cell system is disclosed which includes such an arrangement, especially for providing power to a stationary or mobile power consuming unit like especially an auxiliary power unit (APU) for application in aircraft, ships and vehicles, or as a part of a hybrid drive or as a sole driving unit for, e.g., a ship or a vehicle.

10 Claims, 5 Drawing Sheets

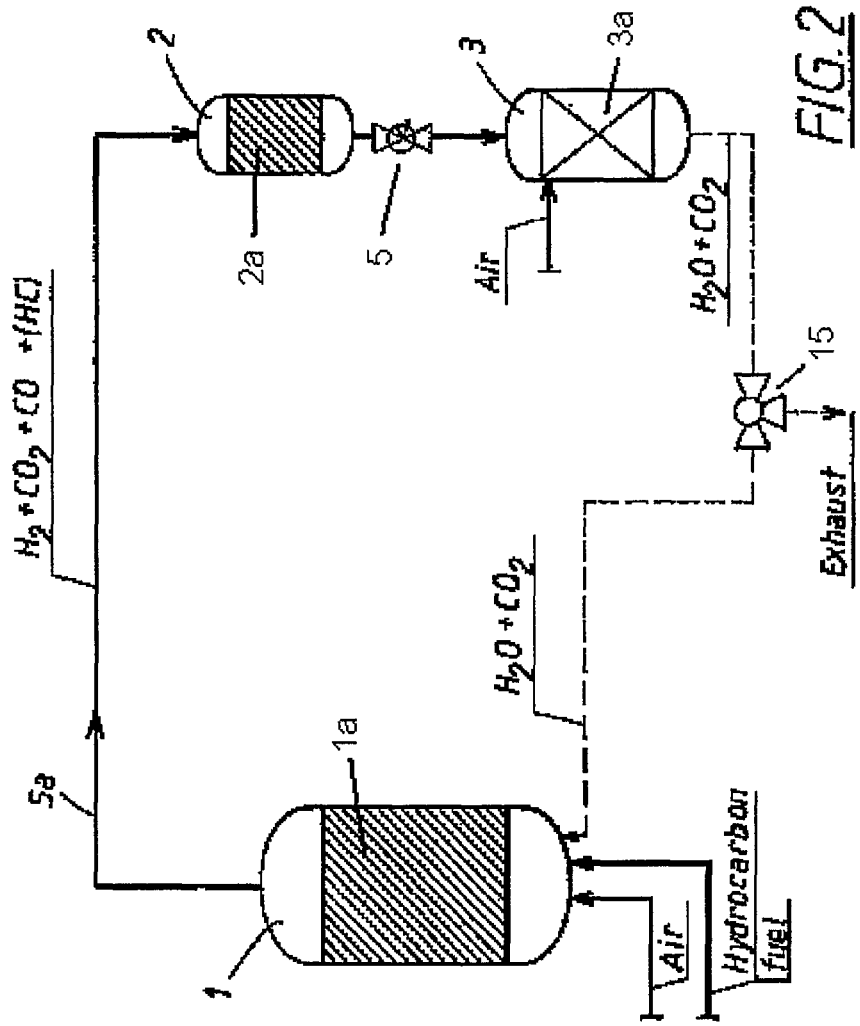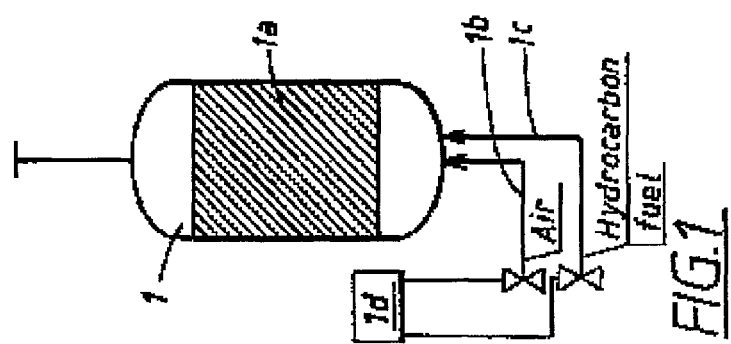

METHOD AND ARRANGEMENT FOR REFORMING FUEL

The invention relates to a method and arrangement for reforming a hydrocarbon fuel like for example di-methyl ether (DME), methanol, ethanol, propanol, or any variants or other oxidized fuels, for generating hydrogen especially for supplying a fuel cell. Furthermore, the invention relates to a fuel cell system comprising such an arrangement, especially for providing power to a stationary or mobile power consuming unit like especially an auxiliary power unit (APU) for application in aircraft, ships and vehicles, or as a part of a hybrid drive or as a sole driving unit for e.g., for a ship or a vehicle.

Fuel cell systems are generally considered as highly feasible solutions especially for providing power to vehicles, and in particular for eliminating idle operation of heavy-duty trucks.

For providing a fuel cell with hydrogen, fuels can be reformed for generating this hydrogen. Such a reforming process requires water steam for operating a fuel reformer. For starting-up the reforming process, the water steam usually has to be generated from external water which is stored in a water tank. However, storing water in a water tank on-board a vehicle is not feasible in cold geographic regions because the water can freeze so that the system may be damaged as well as considerably slowed down during the start-up phase.

US 2001/0038816 discloses a gas generator for generating a hydrogen rich gas from a water-fuel mixture by catalytic steam reforming and/or from an oxygen-fuel mixture by partial oxidation, wherein the generator includes at least one water vessel. The stored water contains a water-methanol mixture having a mixing ratio which is effective to ensure adequate frost protection. However, this might cause difficulties to control and optimize the reforming process.

WO 00/70697 discloses a fuel cell system which instead of separate fuel and water supplies uses an emulsion of fuel and water which can be formulated to remain in a liquid state at low ambient operating temperatures. Additives are added to the emulsion in order to further lower the freezing point. However, this system has the same disadvantages as the above gas generator and furthermore requires considerable changes of the whole arrangement.

It is desirable to provide a method and an arrangement for reforming fuel to produce hydrogen for a fuel cell, which by simple measures can be started and operated reliably especially under ambient temperatures which are below the freezing point of water.

It is desirable to provide a method and an arrangement for reforming fuel which can be started and operated reliably especially under freezing ambient temperature conditions without using anti-freezing agents in a water supply.

One considerable advantage of these solutions is the fact that no external water supply and no extra water tank which is filled with water for starting the process so that a considerable amount of weight is saved. This is especially important in case of a fuel cell system for mobile applications as e.g., the above mentioned applications in aircrafts and vehicles, because the water supply which is required for the steady state operation is considerably smaller.

By this, a fuel cell system can be provided which due to its low weight and the fact that it can be operated under ambient temperatures which are below the freezing point of water, is especially suitable for mobile applications as e.g., the above mentioned applications in aircrafts and vehicles.

BRIEF DESCRIPTION OF THE DRAWINGS

Further details, features and advantages of the invention become obvious from the following description of exemplary and preferred embodiments of the invention with respect to the drawings in which schematically shows:

FIG. 1 a block diagram of a first component of an arrangement according to the invention for presenting an initial step of a start-up phase of a method according to the invention;

FIG. 2 a block diagram of the arrangement for presenting a first stage of the start-up phase of the method according to the invention;

DETAILED DESCRIPTION

Figure 3:
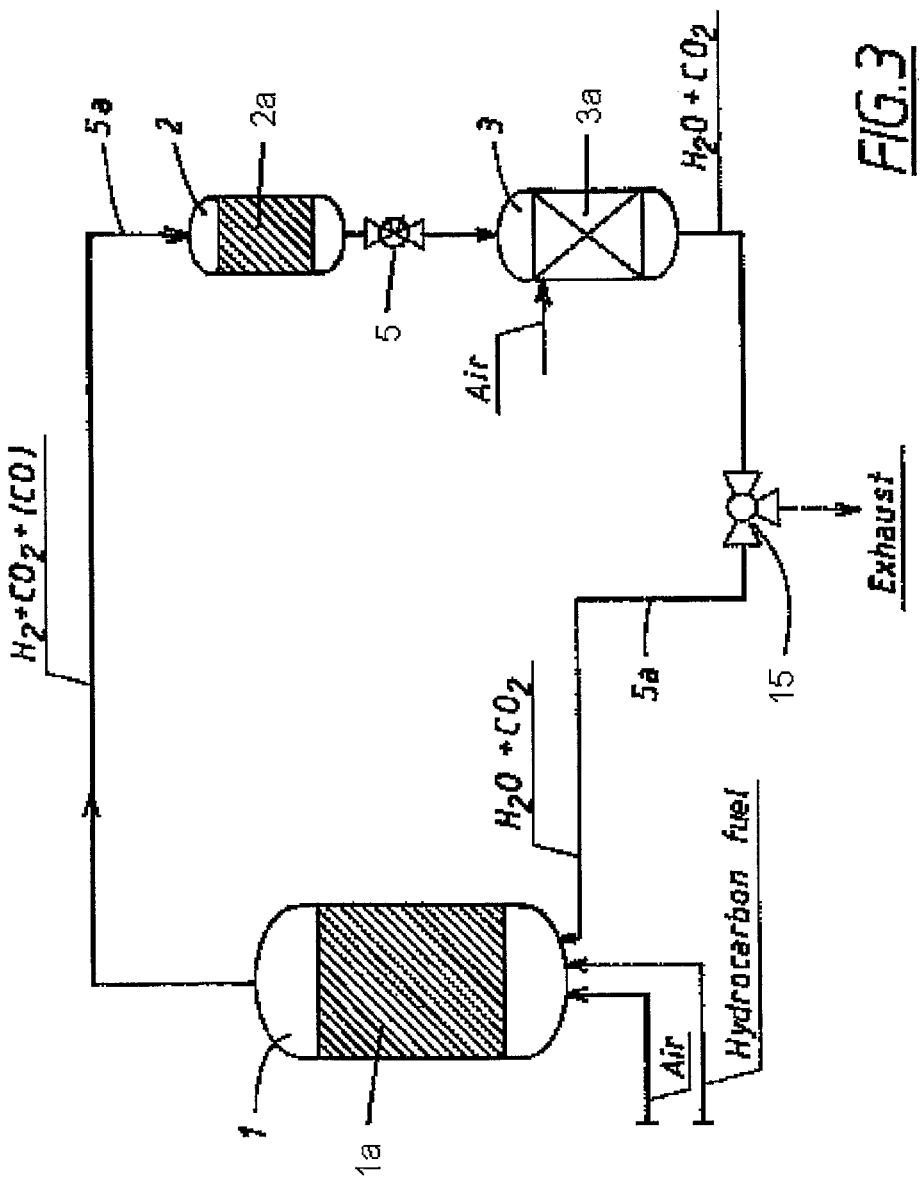
FIG. 3 a block diagram of the arrangement for presenting a second and a third stage of the start-up phase of the method according to the invention.

With the method and the arrangement according to the invention a fuel reforming process which is conducted for supplying a fuel cell with hydrogen can be started by means of a start-up phase which needs no extra water from an external water supply.

Basically, this is accomplished by an arrangement according to the invention for conducting a start-up phase in which at first hydrocarbon fuel is converted in a fuel reformer comprising an oxidation catalyst by an exothermic catalytic partial oxidation process (CPO or catalytic POx) to hydrogen. The generated hydrogen is fed to a catalytic combustion reactor, in which the generated hydrogen is catalytically converted into water steam. The water steam is fed back into the fuel reformer whereby an endothermic catalytic steam reforming process is initiated, so that by the combination of the exothermic and the endothermic process gradually an autothermal fuel reforming process (ATR, which is also called autothermic mode and is disclosed e.g., in US 2001/0038816) is established.

When this autothermal (ATR) process is stablized, a part or all of the generated hydrogen is fed to a fuel cell in which electricity and water are generated in a known manner, thereby terminating the start-up phase. The water which is evaporated is fed back into the fuel reformer so that the fuel cell system is self-sufficient with respect to the need and the generation of water steam during the start-up phase as well as during the steady state operation phase.

By including the catalytic combustion reactor into the arrangement that is provided for creating water steam from hydrogen generated in a partial oxidation process, steam can be generated directly from the fuel which obviates the need for storing water needed for the start-up phase of the arrangement for reforming fuel.

However, in dependence on the kind of the fuel to be reformed and its composition and components, not only hydrogen is generated by the fuel reformer, but also carbon dioxide, carbon monoxide and fractions of hydrocarbons.

While carbon dioxide has largely no influence on the method, especially carbon monoxide may decrease the efficiency of the whole fuel cell system and/or may damage one or more of its components. In order to avoid this, the gas stream which is generated by the fuel reformer and which comprises the wanted hydrogen, is purified prior to supplying it to the fuel cell. For this purpose, the arrangement is provided with a gas clean-up reactor by which especially the amount of carbon monoxide is reduced below an allowable threshold value or is minimized, so that the performance of the fuel cell is not decreased or shut down by its aggressive chemical properties.

In the following, this start-up phase shall now be described in more details with reference to the drawings in which the same reference signs denote the same or corresponding parts or units. The drawings each show only the active parts and components of the arrangement in the related stages and phases. With respect to the general chemical reactions in connection with fuel reforming, it is referred to both of the prior art documents mentioned in the introductory part above which are made by reference to a part of this disclosure.

FIG. 1 schematically shows the fuel reformer 1 comprising a catalyst 1a with one multipurpose catalyst material or at least two one-purpose catalyst materials, so that the catalyst 1a is usable for endothermic steam reforming and exothermic oxidation processes. Further, a first pipe or line 1b for supplying oxygen preferably in the form of ambient air and a second pipe or line 1c for supplying a hydrocarbon fuel to be reformed are provided. Finally, a control unit 1d is provided for closing and partly or totally opening each one valve within the first and the second line 1b, 1c, respectively, in order to control the amount of oxygen (air) and hydrocarbon fuel, respectively, flowing through these lines 1b, 1c into the fuel reformer 1. In FIGS. 2 to 6 the control unit 1d and the valves are not shown for reason of simplicity.

In an initial step preceding a first stage of the start-up phase, the hydrocarbon fuel and air are fed into the fuel reformer 1 at an air-to-fuel ratio (lambda value) which is considerably greater than 1 (which usually is called a lean mixture). This value which is e.g., between about 4 and about 8 and especially between about 5 and about 7, is chosen in dependence on the kind of fuel and the kind of the catalyst 1a such that by an excess of oxygen the fuel reformer 1 is catalytically started and heated by a highly exothermic reaction (combustion of fuel). During this initial step, substantially water and carbon dioxide are produced by the fuel reformer 1.

Alternatively, the fuel reformer 1 can be started by igniting the supplied air/fuel mixture e.g., with a spark plug (not shown). In this case the air-to-fuel ratio can be less lean or more lean than in the above case.

When this combustion process is stable (usually after about 1 to 10 seconds), the first stage of the start-up phase begins. In this first stage the air-to-fuel ratio is reduced by means of the control unit 1d to a lambda value lower than 1, e.g., about 0.25 (or, as an alternative, about one fifth of the lambda value during the initial step, however less than 1) which usually is called a fat mixture, in order to initiate the catalytic partial oxidation (CPO) of the fuel in the oxidation catalyst 1a (and to ensure that the allowable temperature limits of the fuel reformer 1 and the catalyst 1a are not exceeded). The transition between the initial step and this first stage is performed e.g., at a temperature of between about 300 and about 500° C. By this, the products generated by the fuel reformer 1 now change from water and carbon dioxide (initial step) to hydrogen and carbon dioxide and carbon monoxide. Due to the kind of the catalyst 1a and the kind of fuel, there might be small amounts of fractions of the fuel or other hydrocarbons as well, which are commonly indicated in the drawings with the letters "HC".

These products are then fed according to FIG. 2 through a third line or pipe 5a via a gas clean-up reactor 2 (which is not effective as a clean-up reactor at this stage but preferably is only used for cooling the gas stream) into a catalytic combustion reactor 3 comprising a catalyst 3a, into which oxygen, preferably in the form of ambient air is supplied as well.

In a second stage of the start-up phase, the hydrogen is now converted in the catalytic combustion reactor 3 into water steam which according to FIG. 3 is fed back (together with the carbon dioxide) via the third line 5a into the fuel reformer 1. An exhaust valve 15 (first valve) is provided in this line 5a as an overpressure protection. (The dotted pipe or line in FIG. 2 between the outlet of the combustion reactor 2 and the inlet of the fuel reformer 1 only indicates that in a transition phase between this second and the following third stage there is only a small amount of products flowing through this pipe.)

By distributing the heat dissipation in the process of converting hydrogen to water or water steam over more than one catalytic unit, namely both the gas clean-up reactor 2 and the catalytic combustion reactor 3, the risk of overheating the system in the start-up phase is reduced.

As the products from the catalytic combustion reactor 3 are fed back into the fuel reformer 1 (FIG. 3), an endothermic catalytic steam reforming process is initiated in the fuel reformer 1 in a third stage, so that together with the above exothermic catalytic partial oxidation (CPO) process, the chemical reaction in the fuel reformer 1 gradually changes into an autothermal reforming (ATR) process. By this, the concentration of the carbon monoxide in the product of the fuel reformer 1 gradually decreases in comparison to the product of the first stage, until it reaches a minimum value when the ATR process is stable. Furthermore, by-products like fragments of carbon hydrogen (HC) are removed or at least substantially decreased as well in comparison to the first stage.

Figure 4:
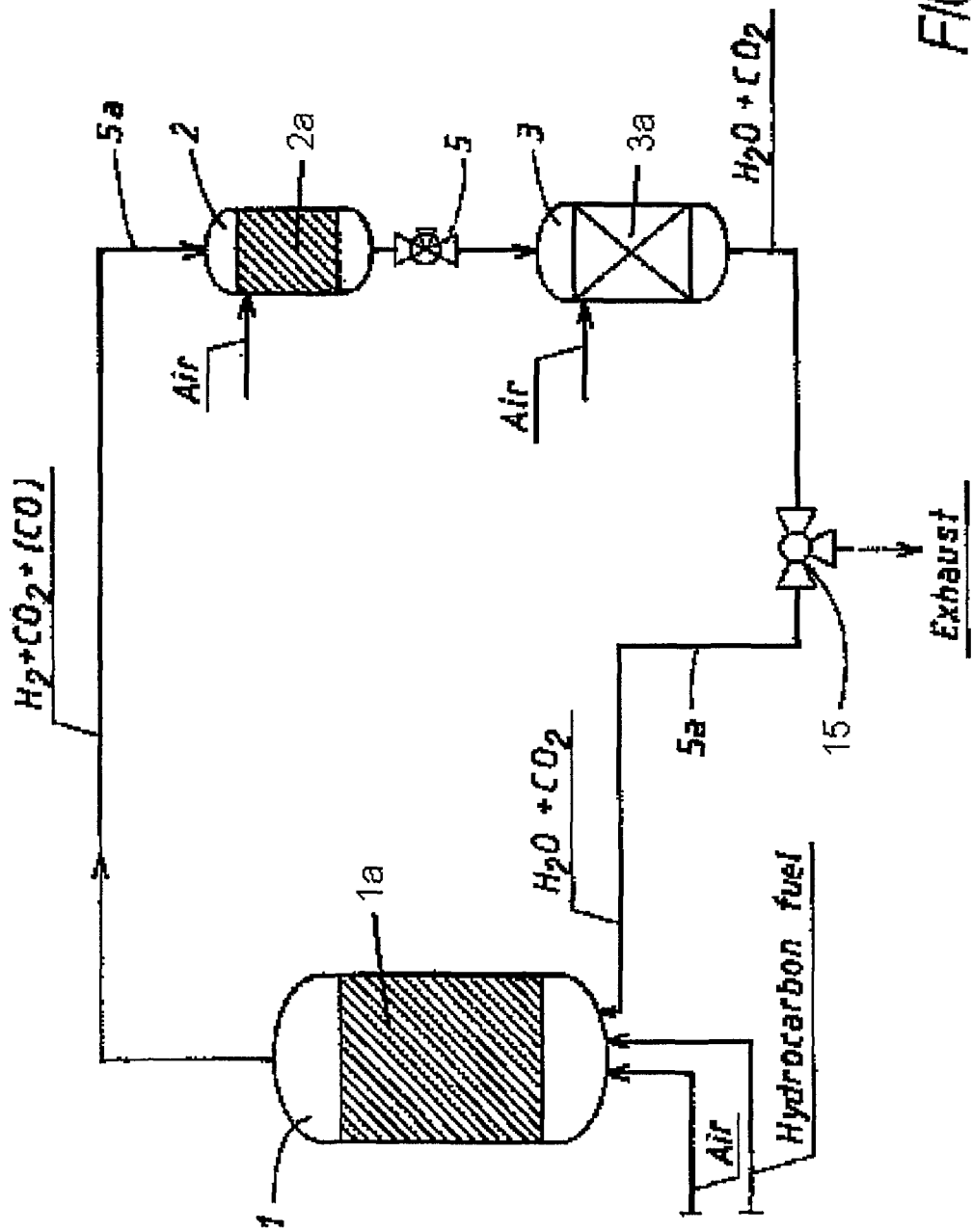
FIG. 4 a block diagram of the arrangement for presenting a fourth stage of the start-up phase of the method according to the invention.

In a fourth stage according to FIG. 4, which begins when the ATR process is stablized, oxygen preferably in the form of ambient air is now fed into the gas clean-up reactor 2, which comprises a preferential oxidizer (PrOx) 2a. By passing the hydrogen rich gas from the fuel reformer 1 through the gas clean-up reactor 2 to the combustion reactor 3, the gas stream is further purified from unwanted by-products, especially from carbon monoxide.

By establishing the ATR process prior to cleaning the products of the fuel reformer 1 by means of the clean-up reactor 2, an overload of this reactor 2 with carbon monoxide is prevented (which might lead to too high temperatures).

When the level of carbon monoxide and other unwanted by-products in the gas stream coming out of the gas clean-up reactor 2 are below an allowable threshold value as mentioned above, a transition phase is initiated according to FIG. 5 by partly opening an outlet of a second valve 5 between the clean-up reactor 2 and the combustion reactor 3 to a fuel cell 4 by means of the control unit 1d (not shown), whereby the products from the gas clean-up reactor 2 are now partly supplied to the fuel cell 4 for generating electric power.

Excess hydrogen from the fuel cell 4 is fed via a separator 7 to the catalytic combustion reactor 3 for generating water steam for the fuel reformer 1 from the portion of the product from the gas clean-up reactor 2 which is not fed to the fuel cell 4 but directly into the combustion reactor 3.

Furthermore, steam is also generated from the water that is generated in the fuel cell 4 by supplying this water via a vessel 8 to a heat exchanger 6. This heat exchanger 6 is supplied with heat from the water steam which is fed from the catalytic combustion reactor 3 to the fuel reformer 1, such that the water from the fuel cell is evaporated in the heat exchanger 6 and provided in the form of steam to the fuel reformer 1 as well.

In this transition phase, the more water is generated by the fuel cell 4 (and is supplied in the form of steam to the fuel reformer 1), the less water steam is generated by and supplied from the combustion reactor 3 to the fuel reformer 1. This is appropriately controlled by controlling the openings of the outlets of the second valve 5 to the fuel cell 4 and to the combustion reactor 3, respectively, by means of the control unit 1*d* (not shown). Furthermore, the steam supplied from the combustion reactor 3 to the fuel reformer 1 can also be controlled by the second valve 15 by means of the control unit 1*d*.

Figure 6:
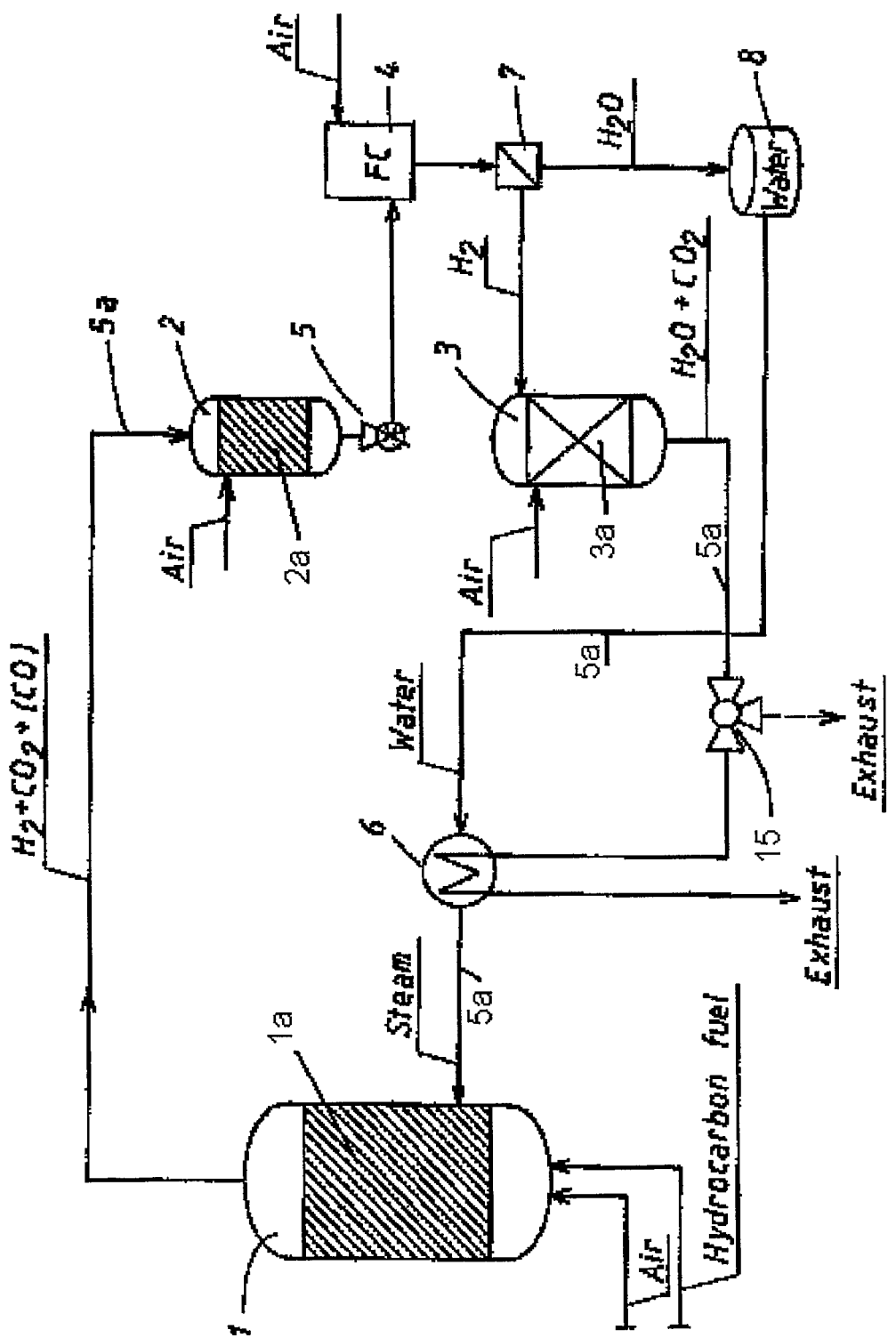
FIG. 6 a block diagram according to FIG. 5 after termination of the transition phase and during the steady state of operation phase of the fuel cell system.

In the steady state operation of the fuel cell system according to FIG. 6 in which the fuel cell 4 has reached its normal operating temperature, sufficient water is generated by the fuel cell 4 so that sufficient steam can be generated by the heat ex-changer 6 for operating the fuel reformer 1, so that there is no need any longer for feeding steam from the combustion reactor 3 into the fuel reformer 1.

In order to realize this, the valve 5 is controlled by the control unit 1*d* (not shown) such that all of the products from the gas clean-up reactor 2 are now fed to the fuel cell 4 alone.

The catalytic combustion reactor 3 is now used only for generating and supplying heat to the heat exchanger 6. This is accomplished by means of excess hydrogen from the fuel cell 4 which is supplied to and converted in the combustion reactor 3 by oxygen from ambient air into water steam. This water steam is exclusively supplied to the heat exchanger 6 in which the heat is used for evaporating water from the water vessel 8 and generated by the fuel cell 4 and for supplying the evaporated water to the fuel reformer 1.

Figure 5:
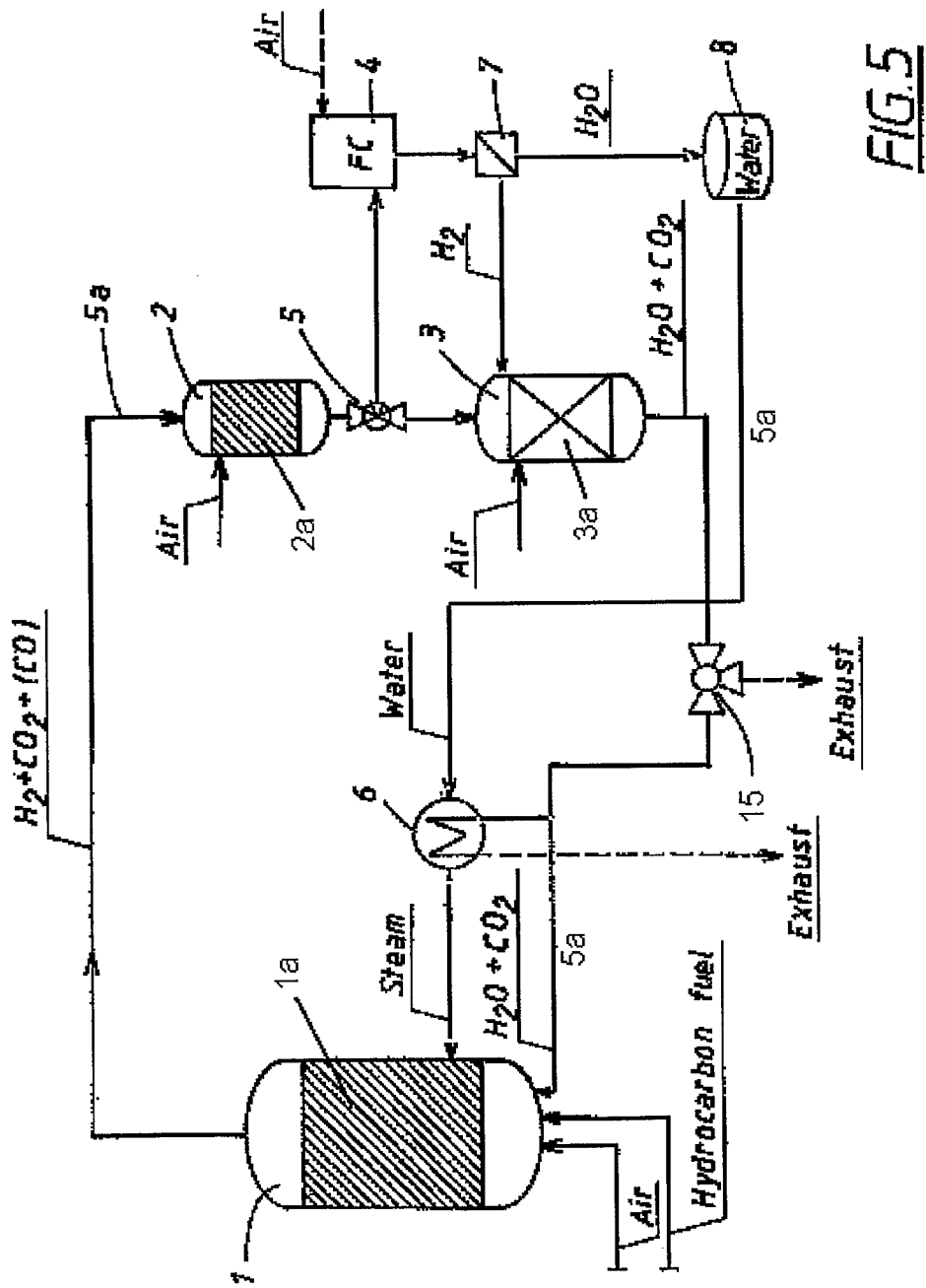
FIG. 5 a block diagram of a fuel cell system comprising an arrangement according to the invention for presenting a transition phase.

As shown in FIGS. 5 and 6, the separating unit 7 is connected to the outlet side of the fuel cell 4. The separating unit 7 separates hydrogen, which is fed into the catalytic combustion reactor 3, from water which is fed into the vessel 8. The vessel 8 stores water only during the operation of the fuel cell system. When the system is shut down, the vessel 8 is preferably emptied, in order to reduce the risk of system damage due to freezing at low ambient temperatures. The vessel 8 may be provided with a valve (not shown) which is controlled by the control unit 1*d* (not shown) such that the valve opens when the system is shut down.

As indicated above, water is fed from the vessel 8 to the heat exchanger 6 for the production of steam (if the vessel 8 already contains water). The feeding of steam generated in the catalytic combustion reactor 3 into the fuel reformer 1 can then gradually be reduced as the generation of steam from water supplied from the vessel 8 to the heat exchanger 6 is increased to an amount that is sufficient for maintaining the autothermal fuel reforming process (ATR) in the fuel reformer 1.

The flow control valve 5 may, in order to enable the fuel cell system to gradually shift from the transition phase to the steady state operation be designed as a multi outlet port valve which is capable of controlling the distribution of the inlet flow among a set of outlets included in the valve 5.

The fuel reformer 1, the gas clean-up reactor 2, the catalytic combustion reactor 3 and the fuel cell 4 are conventional devices well known to a person skilled in the art. The fuel reformer 1 may for instance be using a carrier made of gamma alumina in the form of pellets or a wash coat adhered to a substrate of, for instance, a ceramic monolithe. The carrier may suitably be coated with oxides of manganese or copper.

The gas clean-up reactor 2 may e.g., suitably have a carrier material which is coated with noble metals such as Pt, Ru, Rh and Pd. The catalytic combustion reactor 3 may e.g., suitably have a carrier material which is coated with metals such as Pt, Mn and Pd or other metals. The fuel cell 4 is advantageously a normal or high temperature PEM type.

For the operation of the fuel cell system, temperature sensor elements, means for regulating flow and CO sensors are preferably used to control the flow through the system and the supply of fuel and air into the system by means of the control unit 1*d*.

Generally, di-methyl ether (DME) and methanol are preferred for conducting the method, but other oxidized fuels can be used as well. However, the heavier and longer the molecular chains are, the more carbon monoxide and the lesser carbon dioxide are produced which has the effect that the efficiency and performance of the whole method and arrangement decreases.

The invention claimed is:

1. Method for reforming a hydrocarbon fuel for generating hydrocarbon, comprising:
    a start-up phase comprising establishing an autothermal fuel reforming process in a fuel reformer comprising an oxidation catalyst, which start-up phase comprises, in sequence, the following processes:
        an initial phase of feeding hydrocarbon fuel and air into the fuel reformer as a lean mixture of the air-to-fuel ratio such that the fuel reformer is catalytically started and heated by an exothermic reaction;
        a first stage of feeding hydrocarbon fuel and air into the fuel reformer as a fat mixture for initiating an exothermic catalytic partial oxidation process for reforming the hydrocarbon fuel to hydrogen,
        a second stage for catalytically converting the hydrogen generated in the first stage into water steam by a catalytic combustion reactor;
        a third stage for initiating an endothermic catalytic steam reforming process in the fuel reformer by feeding back into the fuel reformer the water steam which is generated in the second stage, so that by the combination of the exothermic and the endothermic processes the autothermal fuel reforming process is created; and
    a steady state operation phase in which the hydrogen which is generated by the ATR process is fed to a fuel cell for operating the same.

2. Method according to claim 1, wherein in the steady state operation:
    the fuel reformer is operated only with water steam which is generated by a heat exchanger from the water which is supplied from the fuel cell, and
    the heat exchanger is operated by heat supplied from the combustion reactor in the form of water steam which is generated in the combustion reactor from hydrogen which is supplied from the fuel cell.

3. Method according to claim 1, wherein after creating the autothermal fuel reforming process in the third stage, the hydrogen which is generated by the autothermal fuel reforming process is purified prior to supplying it to a fuel cell, by especially reducing the amount of carbon monoxide.

4. Method according to claim 1, wherein a transition phase precedes the steady state operation phase in which transition phase the fuel reformer is operated with water steam which is generated by the combustion reactor from excess hydrogen from the fuel cell, and with water steam which is generated by a heat exchanger from water which is generated in the fuel cell, wherein the heat exchanger is operated by heat of the water steam which is generated by and fed from the combustion reactor to the fuel reformer.

5. Method according to claim 1, comprising feeding oxygen during the exothermic catalytic partial oxidation process into the fuel reformer in the form of ambient air such that an air-to-fuel ratio of the air to fuel mixture is about 0.1 to 0.7.

6. Method according to claim 1, comprising feeding oxygen during the initial step into the fuel reformer in a form of ambient air such that an air-to-fuel ratio of the air to fuel mixture is between about 4 and about 8.

7. Computer program comprising computer program code means adapted to perform a method according to claim 1 when the program is run on a programmable microcomputer.

8. Computer program product stored on a computer readable medium, comprising computer program code means according to claim 7.

9. Method according to claim 1, wherein when the initial step is stable, the catalytic partial oxidation process is initiated by reducing the air-to-fuel ratio to a fat mixture of about 0.25.

10. Method according to claim 1, wherein the transition between the initial step and the autothermal fuel reforming process is performed at a temperature of between about 300° C. and about 500° C.

\* \* \* \* \*